United States Patent
Neuhof et al.

(10) Patent No.: US 12,425,448 B2
(45) Date of Patent: Sep. 23, 2025

(54) DETECTING A SPOOFED ENTITY BASED ON COMPLEXITY OF A DISTRIBUTION OF EVENTS INITIATED BY THE SPOOFED ENTITY

(71) Applicant: Microsoft Technology Licensing, LLC, Redmond, WA (US)

(72) Inventors: Moran Neuhof, Tel-Aviv (IL); Shay Kels, Givatayim (IL); Peleg Hadar, Tel-Aviv (IL); Jonathan Bar Or, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 18/086,440

(22) Filed: Dec. 21, 2022

(65) Prior Publication Data
US 2024/0214419 A1    Jun. 27, 2024

(51) Int. Cl.
*H04L 9/00* (2022.01)
*H04L 9/40* (2022.01)

(52) U.S. Cl.
CPC ...... *H04L 63/1483* (2013.01); *H04L 63/1416* (2013.01); *H04L 63/20* (2013.01)

(58) Field of Classification Search
CPC . H04L 63/1483; H04L 63/1416; H04L 63/20; H04L 63/1466; H04L 63/1425; G06F 21/55; H04W 12/122
See application file for complete search history.

(56) References Cited

U.S. PATENT DOCUMENTS

| | | | |
|---|---|---|---|
| 9,906,544 B1* | 2/2018 | Kurupati | H04L 63/1416 |
| 2019/0205530 A1* | 7/2019 | Brown | G06F 21/566 |
| 2020/0236123 A1* | 7/2020 | Kessel | H04L 63/1416 |

FOREIGN PATENT DOCUMENTS

EP    3506139 A1    7/2019

OTHER PUBLICATIONS

Özçelik, et al., "Deceiving entropy based DoS detection", In Journal of Computers & Security 48, Feb. 1, 2015, pp. 234-245.
Bhattacharya, et al., "Entropy Trust based Approach against IP Spoofing Attacks in Network", In Journal of International Journal of Computer Applications, vol. 67, Issue 23, Apr. 2013, pp. 27-32.
(Continued)

*Primary Examiner* — Syed M Ahsan
(74) *Attorney, Agent, or Firm* — Wade IP Law PLLC

(57) ABSTRACT

Techniques are described herein that are capable of detecting a spoofed entity based on complexity of a distribution of events initiated by the spoofed entity. Frequencies with which events of event types are initiated are determined by an entity during a designated period of time. Complexity of a distribution of the events among the event types is determined based at least on the frequencies with which the events of the event types are initiated by the entity during the designated period of time. Based at least on the complexity of the distribution of the events among the event types being less than or equal to a complexity threshold, the entity is identified as a spoofed entity associated with a spoofing attack. A security action is performed with regard to the entity based at least on the entity being identified as the spoofed entity associated with the spoofing attack.

20 Claims, 6 Drawing Sheets

(56) References Cited

OTHER PUBLICATIONS

Bhuvaneswari, "Information entropy based event detection during disaster in cyber-social networks", In Information entropy based event detection during disaster in cyber-social networks, May 14, 2019, 13 Pages.

Chakraborty, et al., "Detecting DDoS Attacks in SDN using Entropy based methods", Retrieved From: https://cs.binghamton.edu/~huilu/slides580ksp20/demo5.pdf, Mar. 23, 2022, 30 Pages.

Ehrlich, et al., "An Entropy Based Method to Detect Spoofed Denial of Service (DoS) Attacks", In Book of Telecommunications Modeling, Policy, and Technology, Feb. 2008, pp. 101-122.

Xu, et al., "Identifying Vital Nodes in Complex Networks by Adjacency Information Entropy", In Journal of Scientific Reports, vol. 10, Issue 1, Feb. 14, 2020, 12 Pages.

Jeyanthi, et al., "An enhanced entropy approach to detect and prevent DDoS in cloud environment.", In International Journal of Communication Networks and Information Security, Aug. 1, 2013, 13 Pages.

Jeyanthi, et al., "An Entropy Based Approach to Detect and Distinguish DDoS Attacks from Flash Crowds in VoIP Networks", In International Journal of Network Security, vol. 14, Issue 5, Sep. 2012, pp. 257-269.

Lee, et al., "Information-theoretic measures for Anomaly Detection", In Proceedings of IEEE Symposium on Security and Privacy, May 14, 2022, pp. 130-143.

Speidel, et al., "Entropy-based Event Detection", Retrieved From: https://www.sfu.ca/~ljilja/cnl/guests/ddos-sfu.pdf, 2011, 43 Pages.

International Search Report and Written Opinion received for PCT Application No. PCT/US23/081466, Mar. 22, 2024, 12 pages.

International Preliminary Report on Patentability (Chapter I) received for PCT Application No. PCT/US23/081466, mailed on Jul. 3, 2025, 7 pages.

* cited by examiner

| 400 | | | | | | |
|---|---|---|---|---|---|---|
| | CreateProcess {402} | FileSignature {404} | LoadImage {406} | FileCreated {408} | FileModified {410} | RegistryKeyCreated ... {422} |
| Machine 1 {412} | 223 | 257 | 215 | 442 | 25 | 33 |
| Machine 2 | 452 | 2050 | 602 | 546 | 4 | 20 |
| Machine 3 | 61 | 719 | 28 | 120 | 44 | 13 |
| Machine 4 | 100 | 0 | 0 | 0 | 0 | 100 |
| Machine 5 | 10000 | 0 | 0 | 0 | 0 | 0 |

FIG. 4

| 500 | | | | | | |
|---|---|---|---|---|---|---|
| | CreateProcess {502} | FileSignature {504} | LoadImage {506} | FileCreated {508} | FileModified {510} | RegistryKeyCreated ... {522} |
| Machine 1 {512} | 0.186610879 | 0.215062762 | 0.1799163 | 0.3698745 | 0.0209205 | 0.027615063 |
| Machine 2 | 0.123026674 | 0.557974959 | 0.1638541 | 0.1486119 | 0.00108873 | 0.005443658 |
| Machine 3 | 0.061928934 | 0.729949239 | 0.0284264 | 0.1218274 | 0.04467005 | 0.01319797 |
| Machine 4 | 0.5 | 0 | 0 | 0 | 0 | 0.5 |
| Machine 5 | 1 | 0 | 0 | 0 | 0 | 0 |

FIG. 5

DETECTING A SPOOFED ENTITY BASED ON COMPLEXITY OF A DISTRIBUTION OF EVENTS INITIATED BY THE SPOOFED ENTITY

BACKGROUND

Cybersecurity tools, such as endpoint detection and response, commonly monitor behavior of machines and users of those machines to detect and/or prevent malicious activity. Malicious activity is activity that negatively affects security or performance of a machine or security of a user of the machine. Such cybersecurity tools often are capable of detecting organization-wide attacks, as well as attacks that target a single machine. A cybersecurity tool typically includes agents and a centralized server component. The agents are deployed on machines to gather data. The centralized server component receives and processes the data gathered by the agents. The centralized server component often integrates the data and uses the integrated data to detect a variety of different types of threats and to establish patterns of suspicious behavior across the machines and users of an organization.

Due to the increasing prevalence of cybersecurity tools in organizations and the effectiveness of the cybersecurity tools in detecting and preventing cyber-attacks, some malicious entities attempt to tamper with the cybersecurity tools' ability to detect malicious behavior. This can be achieved in various ways, including 1) tampering with agents (e.g., the ability of the agents to gather data) on target machines, 2) tampering with a centralized server component's processing of data collected by the agents, and 3) interfering with the ability of an organization's security operations center that utilizes a cybersecurity tool to detect, manage, and resolve current threats.

"Spoofing" is one example technique that a malicious entity can use to interfere with a security operation center's operation and with a cybersecurity tool's ability to detect malicious behavior. In a spoofing attack, one or more machines are spoofed to report false information. In one example, the spoofed machines may be used to create false flags, which erroneously indicate that malicious activity is occurring in the organization's network. In another example, the spoofed machines may be used to distract a security operations center from a real attack that is occurring in the organization's network. The spoofing may cause alert fatigue and/or confuse responders by onboarding numerous non-existing machines to the organization's network. A spoofing attack may be described as a Denial of Service (DOS) attack that targets an organization's security operations center and prevents or delays the security operations center from responding to threats in the organization's network.

SUMMARY

If automated onboarding of a fake (i.e., spoofed) machine in a network is possible, it may be desirable to detect the spoofed machine and mark the spoofed machine as "fake" to enable a system, such as a security operations center, to ignore telemetry that is received from the spoofed machine.

Most onboarded machines have a complex telemetry profile. Even when idle, a machine often exhibits a variety of behaviors, resulting in a complex telemetry pattern. For instance, the telemetry may reflect user activity, maintenance, automation, and/or background processes. A behavior of a machine may pertain to a registry, a file, a network, and/or a process. For example, a behavior that pertains to a file may be a read, write, open, or delete action. An attacker spoofing multiple machines and sending a fixed set of telemetry reports is likely to result in a limited number of report types that are sent in a repetitive matter. Even if the attacker discovers a way to send telemetry from a spoofed machine, the attacker may need to discover and analyze the format of a substantial number of report types, including the associated field unique to each specific report type. For instance, registry set events fields may be quite different from network connection events reports.

Various approaches are described herein for, among other things, detecting a spoofed entity based on complexity of a distribution of events initiated by the spoofed entity. A spoofed entity is a fictitious representation of an entity. An entity is anything that generates events. Examples of an entity include but are not limited to a computing device, a user (e.g., a user regardless of application(s) with which the events are associated or a user with regard to a particular application), a logging system, a Windows® secure kernel, an Internet Protocol (IP) address, a process (e.g., an application), and a virtual machine.

An event is a message that indicates occurrence of an action (e.g., an asynchronous action). Examples of an action include but are not limited to a keystroke, a mouse movement, a mouse click, a touchscreen event (e.g., a gesture), window resizing, receipt of a message from a program, a timer expiring, and an operation (e.g., access) performed with regard to a registry, a file, a network, or a process. For instance, the event may be application-level information from an underlying framework (e.g., a graphical user interface (GUI) toolkit). Each event that is initiated by an entity (e.g., a spoofed entity) may be triggered by the entity, a user of the entity, software, or a hardware device (e.g., a timer). The event may include information that indicates a type of the event, a time instance at which the event was initiated, who or what triggered initiation of the event, and/or a manner in which the event is to be processed.

It will be recognized that events may be used at instruction set level to complement interrupts. Events often are implemented synchronously, whereas interrupts are implemented asynchronously. For instance, even if events are received asynchronously, the events may be handled synchronously with program flow.

In an example approach, frequencies with which events of specified event types are initiated are determined by an entity during a designated period of time. For instance, a first frequency with which events of a first event type are initiated may be determined; a second frequency with which events of a second event type are initiated may be determined, and so on. Complexity of a distribution of the events among the specified event types is determined based at least on the frequencies with which the events of the specified event types are initiated by the entity during the designated period of time. Based at least on (e.g., in response to, as a result of) the complexity of the distribution of the events among the specified event types being less than or equal to a complexity threshold, the entity is identified as a spoofed entity associated with a spoofing attack. A security action is performed with regard to the entity based at least on the entity being identified as the spoofed entity associated with the spoofing attack.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 4 illustrates an example event count matrix in accordance with an embodiment.

FIG. 5 illustrates an example probability matrix in accordance with an embodiment.

Figure 1:
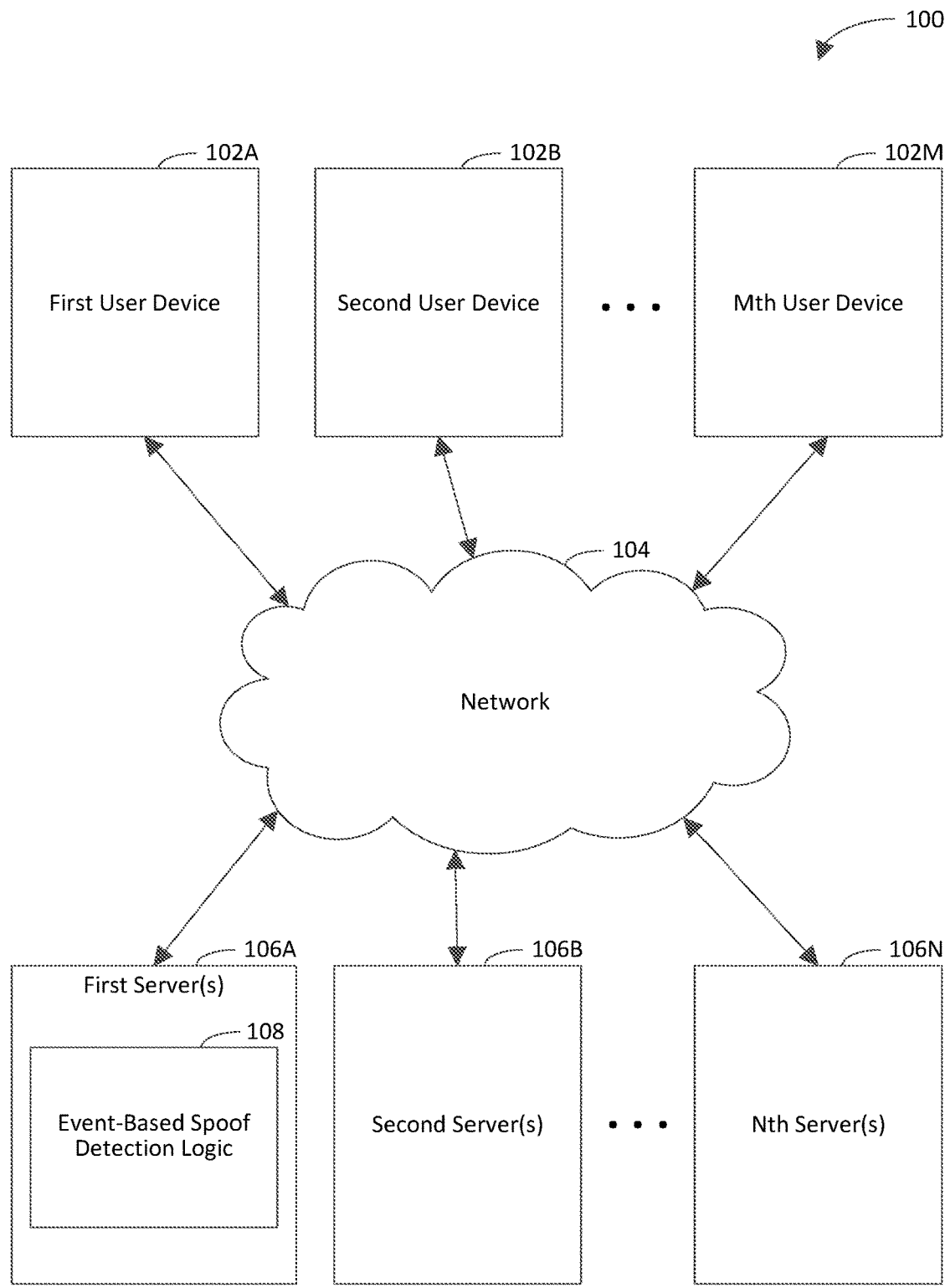
FIG. 1 is a block diagram of an example event-based spoof detection system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

If automated onboarding of a fake (i.e., spoofed) machine in a network is possible, it may be desirable to detect the spoofed machine and mark the spoofed machine as "fake" to enable a system, such as a security operations center, to ignore telemetry that is received from the spoofed machine.

Most onboarded machines have a complex telemetry profile. Even when idle, a machine often exhibits a variety of behaviors, resulting in a complex telemetry pattern. For instance, the telemetry may reflect user activity, maintenance, automation, and/or background processes. A behavior of a machine may pertain to a registry, a file, a network, and/or a process. For example, a behavior that pertains to a file may be a read, write, open, or delete action. An attacker spoofing multiple machines and sending a fixed set of telemetry reports is likely to result in a limited number of report types that are sent in a repetitive matter. Even if the attacker discovers a way to send telemetry from a spoofed machine, the attacker may need to discover and analyze the format of a substantial number of report types, including the associated field unique to each specific report type. For instance, registry set events fields may be quite different from network connection events reports.

Example embodiments described herein are capable of detecting a spoofed entity based on complexity of a distribution of events initiated by the spoofed entity. A spoofed entity is a fictitious representation of an entity. An entity is anything that generates events. Examples of an entity include but are not limited to a computing device, a user (e.g., a user regardless of application(s) with which the events are associated or a user with regard to a particular application), a logging system, a Windows® secure kernel, an Internet Protocol (IP) address, a process (e.g., an application), and a virtual machine.

An event is a message that indicates occurrence of an action (e.g., an asynchronous action). Examples of an action include but are not limited to a keystroke, a mouse movement, a mouse click, a touchscreen event (e.g., a gesture), window resizing, receipt of a message from a program, a timer expiring, and an operation (e.g., access) performed with regard to a registry, a file, a network, or a process. For instance, the event may be application-level information from an underlying framework (e.g., a graphical user interface (GUI) toolkit). Each event that is initiated by an entity (e.g., a spoofed entity) may be triggered by the entity, a user of the entity, software, or a hardware device (e.g., a timer). The event may include information that indicates a type of the event, a time instance at which the event was initiated, who or what triggered initiation of the event, and/or a manner in which the event is to be processed.

It will be recognized that events may be used at instruction set level to complement interrupts. Events often are implemented synchronously, whereas interrupts are implemented asynchronously. For instance, even if events are received asynchronously, the events may be handled synchronously with program flow.

Example techniques described herein have a variety of benefits as compared to conventional techniques for detecting a spoofed entity. For instance, the example techniques are capable of increasing security of a computing system and/or a user of the computing system based on (e.g., based at least on) a distribution of events that are initiated by the spoofed entity. By basing detection of the spoofed entity on complexity of the distribution of the events that are initiated by the spoofed entity, the example techniques may increase accuracy, precision, and/or reliability of the detection of the spoofed entity. For instance, the example techniques may reduce a likelihood of a false positive and/or increase a likelihood of a true positive.

The increased accuracy, precision, and/or reliability of the detection of the spoofed entity may increase a user experience of a user of a computing device in a network that includes the entity and/or an information technology (IT) professional (e.g., security administrator, grader, or campaign team member) who manages or contributes to security of the network, for example, based on an increased confidence in the detection. The increased accuracy, precision, and/or reliability of the detection may increase a likelihood of the IT professional to identify the entity as being spoofed and/or increase a speed with which the IT professional is able to perform a remedial action with regard to a spoofing attack with which the spoofed entity is associated. It will be recognized that identification of the entity as a spoofed entity and performance of the remedial action may be performed automatically (e.g., without involvement of the IT professional). The example techniques may enable threat hunting teams and security administrators to identify threats and terminate attacks shortly after the attacks are initiated.

The example techniques may be relatively fast and easy to implement. The example techniques may enable a closed set of event types to be changed and extended as needed (e.g., on the fly). The example techniques may utilize events received from any suitable agent that is deployed on a client system (e.g., a user device).

The example techniques may reduce an amount of time and/or resources (e.g., processor cycles, memory, network bandwidth) that is consumed to detect a spoofed entity. For example, by basing detection of the spoofed entity on complexity of the distribution of the events that are initiated by the spoofed entity, the time and/or resources that would have been consumed by evaluating entities having relatively complex event distributions is reduced (e.g., avoided). In another example, the time and/or resources that would have been consumed by evaluating the spoofed entity or other entities using other spoof detection techniques may be reduced. By reducing the amount of time and/or resources that is consumed by a computing system to detect a spoofed entity, the efficiency of the computing system may be increased.

FIG. 1 is a block diagram of an example event-based spoof detection system 100 in accordance with an embodiment. Generally speaking, the event-based spoof detection system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the event-based spoof detection system 100 detects a spoofed entity based on complexity of a distribution of events initiated by the spoofed entity. Detail regarding techniques for detecting a spoofed entity based on complexity of a distribution of events initiated by the spoofed entity is provided in the following discussion.

As shown in FIG. 1, the event-based spoof detection system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the event-based spoof detection system 100.

One example type of computer program that may be executed by one or more of the servers 106A-106N is an endpoint detection and response (EDR) program. An EDR program is a computer program that is configured to monitor an entity to detect, mitigate, or block a cyber threat. A cyber threat is a malicious act that is configured (e.g., intended) to steal or damage data or to interfere with operation of an entity, such as a computing system or an enterprise. It will be recognized that an EDR program or at least a portion thereof may be executed by any one or more of the user devices 102A-102M. Examples of an EDR program include but are not limited to Microsoft Defender® developed and distributed by Microsoft Corporation, Cortex XDR® developed and distributed by Palo Alto Networks, Inc., CrowdStrike Falcon® developed and distributed by CrowdStrike Holdings, Inc., Cynet 360 AutoXDR™ developed and distributed by Cynet Security Ltd., SentinelOne® developed and distributed by SentinelOne, Inc., Symantec Endpoint Protection™ developed and distributed by Broadcom, Inc., and Trend Micro One™ developed and distributed by Trend Micro Inc. It will be recognized that the example techniques described herein may be implemented using an EDR program. For instance, a software product (e.g., a subscription service, a non-subscription service, or a combination thereof) may include the EDR program, and the software product may be configured to perform the example techniques, though the scope of the example embodiments is not limited in this respect.

The first server(s) 106A are shown to include event-based spoof detection logic 108 for illustrative purposes. The event-based spoof detection logic 108 is configured to detect a spoofed entity based on complexity of a distribution of events initiated by the spoofed entity. In an example implementation, the event-based spoof detection logic 108 determines frequencies with which events of specified event types are initiated by an entity during a designated period of time. The event-based spoof detection logic 108 determines complexity of a distribution of the events among the specified event types based at least on (e.g., in response to, as a result of) the frequencies with which the events of the specified event types are initiated by the entity during the designated period of time. Based at least on the complexity of the distribution of the events among the specified event types being less than or equal to a complexity threshold, the event-based spoof detection logic 108 identifies the entity as a spoofed entity associated with a spoofing attack. The event-based spoof detection logic 108 performs a security action with regard to the entity based at least on the entity being identified as the spoofed entity associated with the spoofing attack.

The event-based spoof detection logic 108 may use machine learning to perform at least some of its operations. For instance, the event-based spoof detection logic 108 may use the machine learning to analyze (e.g., develop and/or refine an understanding of) events, frequencies of the events, event types, distributions of the events among the event types, complexities of the distributions, entities, security actions, relationships therebetween, and confidences in those relationships. For example, the event-based spoof detection logic 108 may use the machine learning to analyze the frequencies of the events to determine the complexity of the distribution of the events, to determine whether the entity is a spoofed entity, and to determine the security action to be performed.

In some example embodiments, the event-based spoof detection logic 108 uses a neural network to perform the machine learning to detect a spoofed entity based on complexity of a distribution of events initiated by the spoofed entity. Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the event-based spoof detection logic 108 employs a feed forward neural network to train a machine learning model that is used to determine ML-based confidences. Such ML-based confidences may be used to determine likelihoods that events will occur.

A transformer-based neural network is a neural network that incorporates a transformer. A transformer is a deep learning model that utilizes attention to differentially weight the significance of each portion of sequential input data. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a spoofed entity model (e.g., to identify spoofed entities) by utilizing information, such as distributions of the events among the event types, the complexities of the distributions, the entities, the security actions, the relationships therebetween, and ML-based confidences that are derived therefrom.

In example embodiments, the event-based spoof detection logic 108 includes training logic and inference logic. The training logic is configured to train a machine learning algorithm that the inference logic uses to determine (e.g., infer) the ML-based confidences. For instance, the training logic may provide sample events, sample frequencies of the sample events, sample event types, sample distributions of the sample events among the sample event types, sample complexities of the sample distributions, sample entities, and sample security actions as inputs to the algorithm to train the algorithm. The sample data may be labeled. The machine learning algorithm may be configured to derive relationships between the features (e.g., events, frequencies of the events, event types, distributions of the events among the event types, complexities of the distributions, entities, security actions) and the resulting ML-based confidences. The inference logic is configured to utilize the machine learning algorithm, which is trained by the training logic, to determine the ML-based confidence when the features are provided as inputs to the algorithm.

The event-based spoof detection logic 108 may be implemented in various ways to detect a spoofed entity based on complexity of a distribution of events initiated by the spoofed entity, including being implemented in hardware, software, firmware, or any combination thereof. For example, the event-based spoof detection logic 108 may be implemented as computer program code configured to be executed in one or more processors. In another example, at least a portion of the event-based spoof detection logic 108 may be implemented as hardware logic/electrical circuitry. For instance, at least a portion of the event-based spoof detection logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the event-based spoof detection logic 108 may be (or may be included in) an EDR program, though the scope of the example embodiments is not limited in this respect.

The event-based spoof detection logic 108 is shown to be incorporated in the first server(s) 106A for illustrative purposes and is not intended to be limiting. It will be recognized that the event-based spoof detection logic 108 (or any portion(s) thereof) may be incorporated in any one or more of the servers 106A-106N, any one or more of the user devices 102A-102M, or any combination thereof. For example, client-side aspects of the event-based spoof detection logic 108 may be incorporated in one or more of the user devices 102A-102M, and server-side aspects of event-based spoof detection logic 108 may be incorporated in one or more of the servers 106A-106N.

Figure 2:
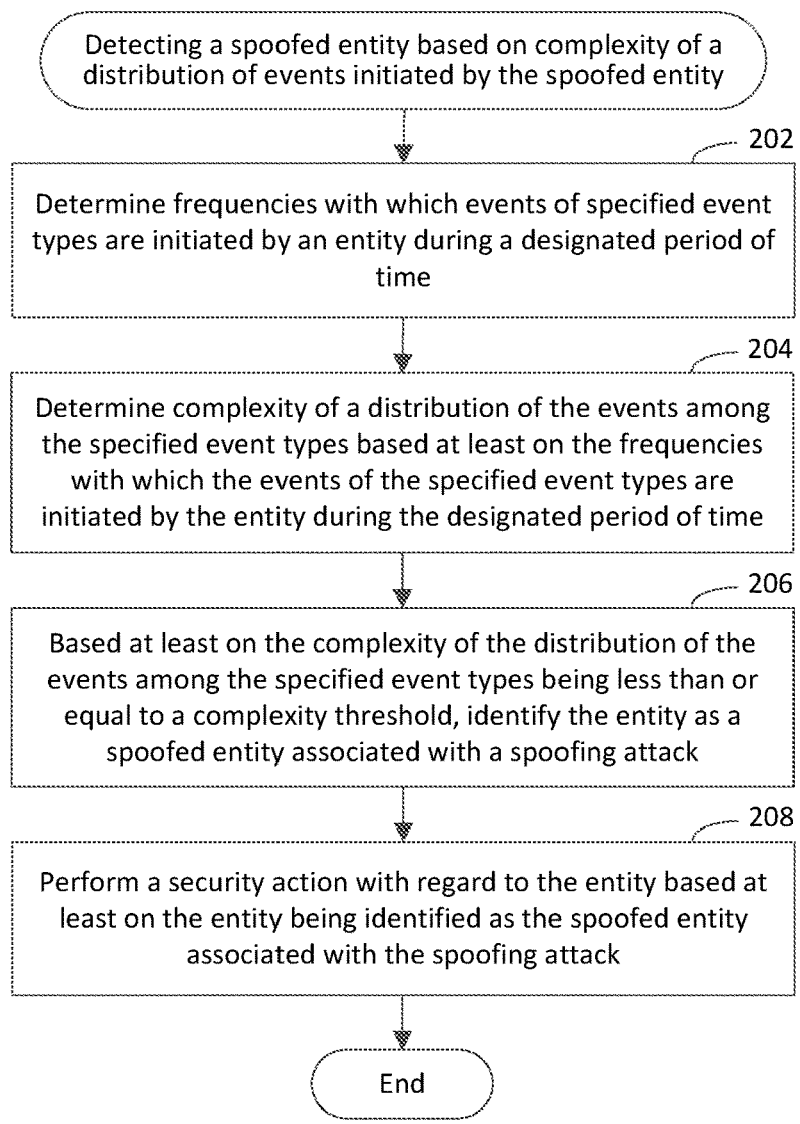
FIG. 2 depicts a flowchart of an example method for detecting a spoofed entity based on complexity of a distribution of events initiated by the spoofed entity in accordance with an embodiment.
Figure 3:
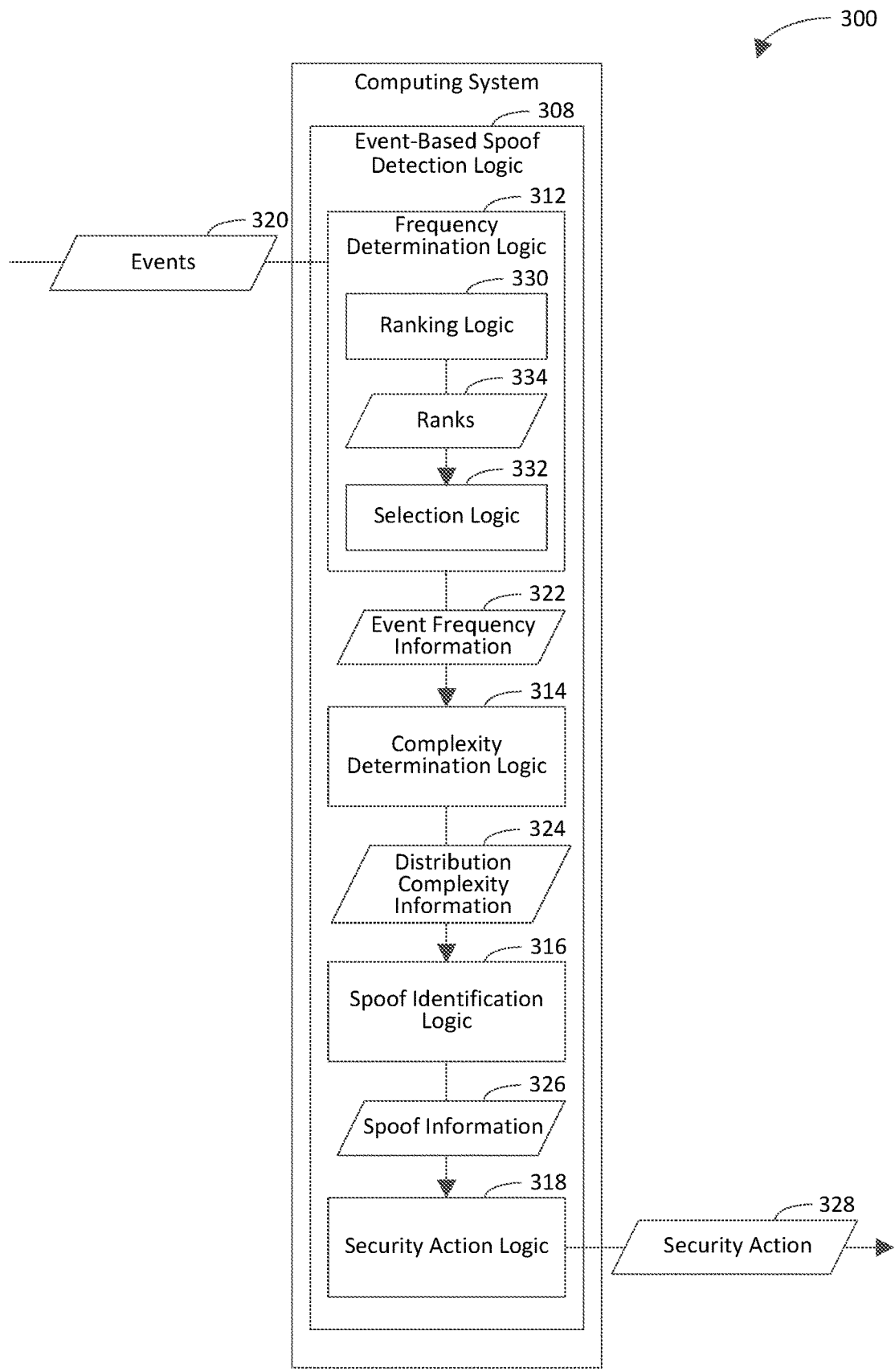
FIG. 3 is a block diagram of an example computing system in accordance with an embodiment.

FIG. 2 depicts a flowchart 200 of an example method for detecting a spoofed entity based on complexity of a distribution of events initiated by the spoofed entity in accordance with an embodiment. Flowchart 200 may be performed by the first server(s) 106A shown in FIG. 1, for example. For illustrative purposes, flowchart 200 is described with respect to computing system 300 shown in FIG. 3, which is an example implementation of the first server(s) 106A. As shown in FIG. 3, the computing system 300 includes frequency determination logic 312, complexity determination logic 314, spoof identification logic 316, and security action logic 318. The frequency determination logic 312 includes ranking logic 330 and selection logic 332. Further structural and operational embodiments will be apparent to persons skilled in the relevant art(s) based on the discussion regarding flowchart 200.

As shown in FIG. 2, the method of flowchart 200 begins at step 202. In step 202, frequencies with which events of specified event types are initiated by an entity during a designated period of time are determined. An event is a message that indicates occurrence of an action. Examples of an action include but are not limited to a keystroke, a mouse movement, a mouse click, a touchscreen event (e.g., a gesture), window resizing, receipt of a message from a program, a timer expiring, and an operation (e.g., access) performed with regard to a registry, a file, a network, or a process. An entity is anything that logs events over a designated period of time. For instance, the entity may send the events to a central cloud system for processing. Examples of an entity include but are not limited to a computing device, a user, a logging system, a Windows secure kernel, an Internet Protocol (IP) address, a process (e.g., an application), and a virtual machine. The designated period of time may be a fixed time period or a variable time period. In an example, the designated period of time is a 30-minute time period that begins at a time instance at which the entity is onboarded (e.g., granted access) to a network, is brought online, or begins initiating the events. Each event type may be defined based on any one or more suitable criteria. For example, each event type may be defined based on events of the event type having the same name or a similar name (e.g., assigned by a developer of a feature that utilizes the events). In another example, each event type may be defined based on events of the event type pertaining to the same type of action. For instance, examples of a type of action include but are not limited to a keystroke, a mouse movement, a mouse click, a touchscreen event, and so on.

In an example implementation, the frequency determination logic 312 determines the frequencies with which the events of the specified event types are initiated by the entity during the designated period of time. In an aspect of this implementation, the frequency determination logic 312 categorizes events 320 among the specified event types. For instance, the frequency determination logic 312 may compare one or more attributes of each event with one or more attributes of each specified event type to determine in which of the specified event types the respective event is to be categorized. Accordingly, subsets of the events 320 may be categorized among the respective event types. In accordance with this aspect, the frequency determination logic 312 counts a number of the events 320 that are included in each specified event type to determine the frequency with which events of the respective specified event type are initiated by the entity during the designated period of time. For instance, if 300 events of a specified event type are initiated by the entity within the first 30 seconds of the entity being online, the frequency with which the events are initiated by the entity within the first 30 seconds of the entity being online is 10 events/second. In accordance with this implementation, the frequency determination logic 312 generates event frequency information 322 to indicate the frequencies with which the events of the specified event types are initiated by the entity during the designated period of time.

At step 204, complexity of a distribution of the events among the specified event types is determined based at least on the frequencies with which the events of the specified event types are initiated by the entity during the designated period of time. In an example implementation, the complexity determination logic 314 determines complexity of a distribution of the events 320 among the specified event types based at least on the frequency with which the events of each specified event type are initiated by the entity during the designated period of time. In accordance with this implementation, the complexity determination logic 314 generates distribution complexity information 324 to indicate the complexity of the distribution of the events 320 among the specified event types.

In an example embodiment, determining the complexity of the distribution at step 204 includes determining entropy of the distribution of the events among the specified event types.

In another example embodiment, determining the complexity of the distribution at step 204 is further based at least on a number of the specified event types. In an aspect of this embodiment, the number of the specified event types being relatively higher weighs in favor of the complexity being relatively higher, whereas the number of the specified event types being relatively lower weighs in favor of the complexity being relatively lower.

In yet another example embodiment, determining the complexity of the distribution at step 204 is based at least on a number of the frequencies with which the events of the specified event types are initiated by the entity during the designated period of time that are zero. In an aspect of this embodiment, the number of the frequencies that are zero being greater than or equal to a threshold number corresponds to the complexity being relatively lower, whereas the number of the frequencies that are zero being less than the threshold number corresponds to the complexity being relatively higher.

In still another example embodiment, determining the complexity of the distribution at step 204 is based at least on a proportion of the frequencies with which the events of the specified event types are initiated by the entity during the designated period of time that are zero. In an aspect of this embodiment, the proportion of the frequencies that are zero being greater than or equal to a threshold proportion corresponds to the complexity being relatively lower, whereas the proportion of the frequencies that are zero being less than the threshold proportion corresponds to the complexity being relatively higher.

In another example embodiment, determining the complexity of the distribution at step 204 is based at least on a number of the frequencies with which the events of the specified event types are initiated by the entity during the designated period of time that are less than a positive frequency threshold. In an aspect of this embodiment, the number of the frequencies that are less than the positive frequency threshold being greater than or equal to a threshold number corresponds to the complexity being relatively lower, whereas the number of the frequencies that are less than the positive frequency threshold being less than the threshold number corresponds to the complexity being relatively higher.

In yet another example embodiment, determining the complexity of the distribution at step 204 is based at least on a proportion of the frequencies with which the events of the specified event types are initiated by the entity during the designated period of time that are less than a positive frequency threshold. In an aspect of this embodiment, the proportion of the frequencies that are less than a positive frequency threshold being greater than or equal to a threshold proportion corresponds to the complexity being relatively lower, whereas the proportion of the frequencies that are less than the positive frequency threshold being less than the threshold proportion corresponds to the complexity being relatively higher.

In still another example embodiment, determining the complexity of the distribution at step 204 is based at least on a ratio of a first value to a second value. The first value is a number of the frequencies with which the events of the specified event types are initiated by the entity during the designated period of time that are greater than zero. The second value is a number of the frequencies with which the events of the specified event types are initiated by the entity during the designated period of time that are zero. In an aspect of this embodiment, the ratio being less than or equal to a ratio threshold corresponds to the complexity being relatively lower, whereas the ratio being greater than the ratio threshold corresponds to the complexity being relatively higher. In an example, the first value may be a number of the frequencies with which the events of the specified event types are initiated by the entity during the designated period of time that are greater than zero and that are less than a frequency threshold. The frequency threshold may be any suitable value (e.g., 1 event/minute, 5 events/minute, 10 events/minute, or 8 events/hour).

In another example embodiment, determining the complexity of the distribution at step 204 is based at least on a ratio of a first value to a second value. The first value is a Manhattan norm of the frequencies with which the events of the specified event types are initiated by the entity during the designated period of time. The second value is a Euclidian norm of the frequencies with which the events of the specified event types are initiated by the entity during the designated period of time.

A Manhattan norm (a.k.a. taxicab norm) equals a sum of absolute values of respective elements (e.g., in a vector). The elements in this embodiment are the frequencies with which the events of the specified event types are initiated by the entity during the designated period of time. In an aspect of this embodiment, the Manhattan norm treats all of the elements equally. Accordingly, a first scenario in which a number of the elements is relatively high and the values of the elements are relatively low and a second scenario in which the number of the elements is relatively low and the values of the elements are relatively high may result in the same first value. The Manhattan norm may be represented as follows:

$$L1 = \|x\|_1 = |x_1| + |x_2| + \ldots + |x_n| \quad \text{(Equation 1)}$$

where x1, x2, ..., xn represent the respective elements (i.e., the respective frequencies in this embodiment). Some examples of the Manhattan norm are listed below:

| | |
|---|---|
| $\|100, 0, 0\| = 100$ | (Example 1A) |
| $\|100, 1, 0\| = 101$ | (Example 1B) |
| $\|100, 1, 2, 3, 4, 5, 6\| = 121$ | (Example 1C) |

A Euclidian norm equals a square root of a sum of squares of respective elements (e.g., in a vector). The elements in this embodiment are the frequencies with which the events of the specified event types are initiated by the entity during the designated period of time. The Euclidian norm may be represented as follows:

$$L1 = \|x\|_2 = \left(|x_1|^2 + |x_2|^2 + \ldots + |x_n|^2\right)^{1/2} \quad \text{(Equation 2)}$$

where x1, x2, ..., xn represent the respective elements (i.e., the respective frequencies in this embodiment). Some examples of the Euclidian norm are listed below:

| | |
|---|---|
| $\|100, 0, 0\| = 100$ | (Example 2A) |
| $\|100, 1, 0\| = 100.004$ | (Example 2B) |
| $\|100, 1, 2, 3, 4, 5, 6\| = 100.45$ | (Example 2C) |

In accordance with this embodiment, the ratio of the first value to the second value may be expressed as follows:

$$R = L1/L2 \quad \text{(Equation 3)}$$

where R is the ratio, L1 is the first value, and L2 is the second value.

In an aspect of this embodiment, the ratio being less than or equal to a ratio threshold corresponds to the complexity being relatively lower, whereas the ratio being greater than the ratio threshold corresponds to the complexity being relatively higher.

At step 206, based at least on the complexity of the distribution of the events among the specified event types being less than or equal to a complexity threshold, the entity is identified as a spoofed entity associated with a spoofing attack. In an example implementation, based at least on the complexity of the distribution of the events 320 among the specified event types being less than or equal to the complexity threshold, the spoof identification logic 316 identifies the entity as a spoofed entity associated with a spoofing attack. In accordance with this implementation, the spoof identification logic 316 generates spoof information 326 to indicate that the entity is identified as a spoofed entity.

In an example embodiment, identifying the entity as the spoofed entity at step 206 includes comparing the complexity of the distribution of the events among the specified event types to a reference complexity of a reference distribution of reference events among reference event types that are initiated by a reference entity that is different from the entity, which initiates the events during the designated period of time. In accordance with this embodiment, identifying the entity as the spoofed entity at step 206 is based at least on the complexity of the distribution of the events among the specified event types being less than the reference complexity of the reference distribution of the reference events among the reference event types by at least a threshold amount. In an aspect of this embodiment, the reference complexity of the reference distribution is derived from multiple complexities (e.g., an average of the multiple complexities) of multiple reference distributions of reference events among the reference event types that are initiated by one or more reference entities that are different from the entity, which initiates the events during the designated period of time.

At step 208, a security action is performed with regard to the entity based at least on the entity being identified as the spoofed entity associated with the spoofing attack. For instance, performing the security action at step 208 may include remediating the spoofing attack. In an example implementation, the security action logic performs a security action 328 with regard to the entity based at least on the entity being identified as the spoofed entity associated with the spoofing attack. For instance, the security action logic 318 may perform the security action 328 based on receipt of the spoof information 326 (e.g., based on the spoof information 326 indicating that the entity is identified as a spoofed entity).

In an example embodiment, performing the security action at step 208 includes ignoring events that are received from the entity based at least on the entity being identified as the spoofed entity associated with the spoofing attack. For instance, ignoring the events may include taking no action with regard to the events and/or deleting the events upon receipt.

In another example embodiment, performing the security action at step 208 includes instructing other entities not to communicate with the entity based at least on the entity being identified as the spoofed entity associated with the spoofing attack. For example, the other entities may be notified via an instruction that is broadcast to the other entities. In another example, one or more of the other entities may be notified via a textual communication. Examples of a textual communication include but are not limited to an email, an instant message (IM), a short message service (SMS) communication, a Microsoft Teams® message, and a Slack® message. A Microsoft Teams® message is a message generated using a Microsoft Teams® program, which is developed and distributed by Microsoft Corporation. A Slack® message is a message generated using a Slack® program, which is developed and distributed by Slack Technologies, Inc.

In yet another example embodiment, performing the security action at step 208 includes initiating exclusion of a user of the entity from accessing a network based at least on the entity being identified as the spoofed entity associated with the spoofing attack. For example, initiating the exclusion of the user may include changing a value of a permission setting from a first value to a second value. In accordance with this example, the first value indicates that the user is allowed to access the network, and the second value indicates that the user is not allowed to access the network.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example embodiment, the method of flowchart 200 further includes ranking event types such that ranks of the event types correspond to likelihoods that events corresponding to the event types are detected (e.g., by a program, such as an endpoint detection and response (EDR) program, or a computing system that generates the events). In an example implementation, the ranking logic 330 ranks the event types such that ranks 334 of the event types correspond to the likelihoods that events corresponding to the event types are detected. In accordance with this implementation, the ranking logic 330 provides the ranks 334 to the selection logic for processing. In accordance with this embodiment, the method of flowchart 200 further includes selecting the specified event types from the event types based at least on the ranks of the specified event types being greater than or equal to a rank threshold. In an example implementation, the selection logic 332 selects the specified event types from the event types based at least on the ranks of the specified event types being greater than or equal to the rank threshold. In an aspect of this implementation, the selection logic 332 compares the ranks 334 to the rank threshold to determine which of the ranks 334 are greater than or equal to the rank threshold.

In another example embodiment, the method of flowchart 200 further includes determining that a number of the events that are initiated by the entity during the designated period of time is greater than or equal to a threshold number. In an example implementation, the complexity determination logic 314 determines that the number of the events that are initiated by the entity during the designated period of time is greater than or equal to the threshold number. In accordance with this embodiment, determining the complexity of the distribution at step 204 is performed in response to (e.g., based at least on) the number of the events that are initiated by the entity during the designated period of time being greater than or equal to the threshold number.

It will be recognized that the computing system 300 may not include one or more of the frequency determination logic 312, the complexity determination logic 314, the spoof identification logic 316, the security action logic 318, the ranking logic 330, and/or the selection logic 332. Furthermore, the computing system 300 may include components in addition to or in lieu of the frequency determination logic 312, the complexity determination logic 314, the spoof identification logic 316, the security action logic 318, the ranking logic 330, and/or the selection logic 332.

FIG. 4 illustrates an example event count matrix 400 in accordance with an embodiment. The event count matrix 400 shows event counts for various event types represented by columns 412, 414, 416, 418, 420, and 422 during a designated period of time for various machines represented by rows 402, 404, 406, 408, 410. In particular, the event count matrix 400 includes a first row 402 corresponding to Machine 1, a second row 404 corresponding to Machine 2, a third row 406 corresponding to Machine 3, a fourth row 408 corresponding to Machine 4, and a fifth row 410 corresponding to Machine 5. The event count matrix 400 includes a first column 412 corresponding to a first event type "CreateProcess," a second column 414 corresponding to a second event type "FileSignature," a third column 416 corresponding to a third event type "LoadImage," a fourth column 418 corresponding to a fourth event type "FileCreate," a fifth column 420 corresponding to a fifth event type "FileModified," and a sixth column 422 corresponding to a sixth event type "RegistryKeyCreated."

As shown in FIG. 4, Machine 1 initiates 223 events of the first event type, 257 events of the second event type, 215 events of the third event type, 442 events of the fourth event type, 25 events of the fifth event type, and 33 events of the sixth event type. Accordingly, Machine 1 may be described as having a machine vector of 223, 257, 215, 442, 25, 33. Machine 2 initiates 452 events of the first event type, 2050 events of the second event type, 602 events of the third event type, 546 events of the fourth event type, 4 events of the fifth event type, and 20 events of the sixth event type. Machine 2 may be described as having a machine vector of 452, 2050, 602, 546, 4, 20. Machine 3 initiates 61 events of the first event type, 719 events of the second event type, 28 events of the third event type, 120 events of the fourth event type, 44 events of the fifth event type, and 13 events of the sixth event type. Machine 3 may be described as having a machine vector of 61, 719, 28, 120, 44, 13. Machine 4 initiates 100 events of the first event type, 0 events of the second event type, 0 events of the third event type, 0 events of the fourth event type, 0 events of the fifth event type, and 100 events of the sixth event type. Machine 4 may be described as having a machine vector of 100, 0, 0, 0, 0, 100. Machine 5 initiates 10,000 events of the first event type, 0 events of the second event type, 0 events of the third event type, 0 events of the fourth event type, 0 events of the fifth event type, and 0 events of the sixth event type. Machine 5 may be described as having a machine vector of 10000, 0, 0, 0, 0, 0.

The entropy for each of the Machines 1-5 during the designated period of time may be calculated using the standard Entropy formula:

$$H(X) = -\sum_{i=1}^{n} P(x_i) \log P(x_i) \quad \text{(Equation 4)}$$

Calculation of the entropy for each machine vector may be performed in python using the following function:

```
def calc_entropy(machine_event_vec):
    prob_vec = machine_event_vec /np.sum(machine_event_vec)
    return sum(-i*np.log(i) if i!=0 else 0 for i in prob_vec)
``` where the probability of each event $P(x_i)$ is approximated by its frequency within the machine vector, so that for every event type count in that machine, $x_i$, the probability is represented as follows:

$$P(x_i) = \frac{x_i}{\sum_{j=1}^{n} x_j} \quad \text{(Equation 5)}$$

FIG. 5 illustrates an example probability matrix 500 in accordance with an embodiment. As shown in FIG. 5, the event count matrix 500 includes a first row 502 corresponding to Machine 1, a second row 504 corresponding to Machine 2, a third row 506 corresponding to Machine 3, a fourth row 508 corresponding to Machine 4, and a fifth row 510 corresponding to Machine 5. The event count matrix 500 includes a first column 512 labeled "CreateProcess," a second column 514 labeled "FileSignature," a third column 516 labeled "LoadImage," a fourth column 518 labeled "FileCreate," a fifth column 520 labeled "FileModified," and a sixth column 522 labeled "RegistryKeyCreated." The probability matrix 500 indicates the probabilities for the event types for each of the Machines 1-5 that correspond to the respective event counts shown in FIG. 4. The probabilities are calculated using Equation 5 shown above.

As shown in FIG. 5, the probability of Machine 1 initiating an event of the first event type is 0.186610879. The probability of Machine 1 initiating an event of the second event type is 0.215062762. The probability of Machine 1 initiating an event of the third event type is 0.1799163. The probability of Machine 1 initiating an event of the fourth event type is 0.3698745. The probability of Machine 1 initiating an event of the fifth event type is 0.0209205. The probability of Machine 1 initiating an event of the sixth event type is 0.027615063.

The probability of Machine 2 initiating an event of the first event type is 0.123026674. The probability of Machine 2 initiating an event of the second event type is 0.557974959. The probability of Machine 2 initiating an event of the third event type is 0.1638541. The probability of Machine 2 initiating an event of the fourth event type is 0.1486119. The probability of Machine 2 initiating an event of the fifth event type is 0.00108873. The probability of Machine 2 initiating an event of the sixth event type is 0.005443658.

The probability of Machine 3 initiating an event of the first event type is 0.061928934. The probability of Machine 3 initiating an event of the second event type is 0.729949239. The probability of Machine 3 initiating an event of the third event type is 0.0284264. The probability of Machine 3 initiating an event of the fourth event type is 0.1218274. The probability of Machine 3 initiating an event of the fifth event type is 0.04467005. The probability of Machine 3 initiating an event of the sixth event type is 0.01319797.

The probability of Machine 4 initiating an event of the first event type is 0.5. The probability of Machine 4 initiating an event of the second, third, fourth, or fifth event type is 0. The probability of Machine 4 initiating an event of the sixth event type is 0.5.

The probability of Machine 5 initiating an event of the first event type is 1. The probability of Machine 5 initiating an event of the second, third, fourth, fifth, or sixth event type is 0.

Figure 6:
FIG. 6 is an example table of entropy scores in accordance with an embodiment.
Figure 6:
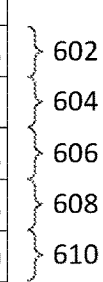

FIG. 6 is an example table 600 of entropy scores in accordance with an embodiment. As shown in FIG. 6, the table 600 includes a first row 602 corresponding to Machine 1, a second row 604 corresponding to Machine 2, a third row 606 corresponding to Machine 3, a fourth row 608 corresponding to Machine 4, and a fifth row 610 corresponding to Machine 5. The table 600 includes a single column that indicates the entropy associated with each of the Machines 1-5, as calculated using the standard Entropy formula shown above in Equation 4. For instance, the table 600 indicates that Machine 1 is associated with an entropy of 0.651564416; Machine 2 is associated with an entropy of 0.520645113; Machine 3 is associated with an entropy of 0.415051918; Machine 4 is associated with an entropy of 0.301029996; and Machine 5 is associated with an entropy of 0.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the event-based spoof detection logic 108, the event-based spoof detection logic 308, the frequency determination logic 312, the complexity determination logic 314, the spoof identification logic 316, the security action logic 318, the ranking logic 330, the selection logic 332, and/or flowchart 200 may be implemented in hardware, software, firmware, or any combination thereof.

For example, any one or more of the event-based spoof detection logic 108, the event-based spoof detection logic 308, the frequency determination logic 312, the complexity determination logic 314, the spoof identification logic 316, the security action logic 318, the ranking logic 330, the selection logic 332, and/or flowchart 200 may be implemented, at least in part, as computer program code configured to be executed in one or more processors.

In another example, any one or more of the event-based spoof detection logic 108, the event-based spoof detection logic 308, the frequency determination logic 312, the complexity determination logic 314, the spoof identification logic 316, the security action logic 318, the ranking logic 330, the selection logic 332, and/or flowchart 200 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
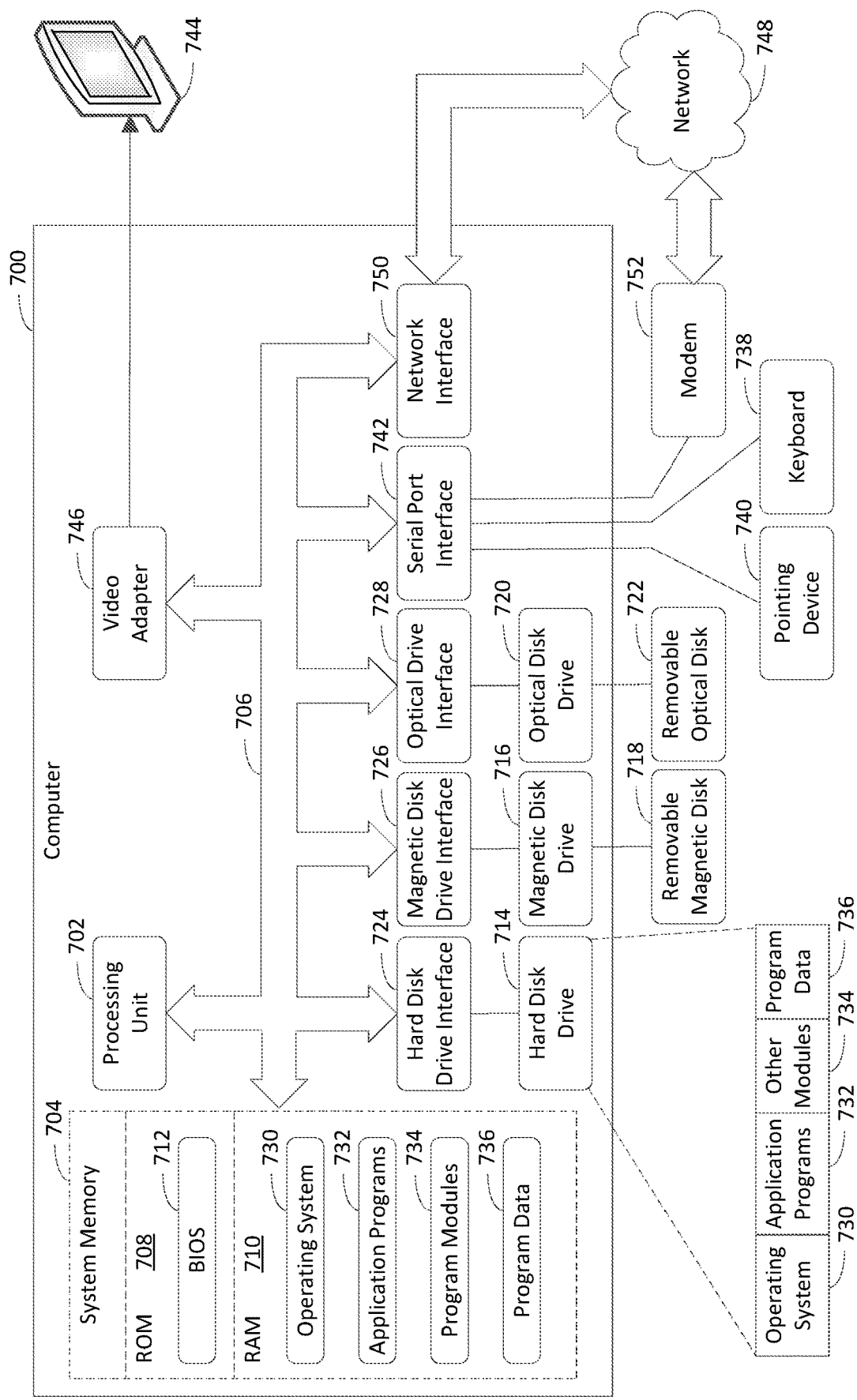
FIG. 7 depicts an example computer in which embodiments may be implemented.

II. Further Discussion of Some Example Embodiments (A1) An example system (FIG. 1, 102A-102M, 106A-106N; FIG. 3, 300; FIG. 7, 700) comprises memory (FIG. 7, 704, 708, 710) and a processing system (FIG. 7, 702) coupled to the memory. The processing system is configured to determine (FIG. 2, 202) frequencies with which events (FIG. 3, 320) of specified event types are initiated by an entity during a designated period of time. The processing system is further configured to determine (FIG. 2, 204) complexity of a distribution of the events among the specified event types based at least on the frequencies with which the events of the specified event types are initiated by the entity during the designated period of time. The processing system is further configured to, based at least on the complexity of the distribution of the events among the specified event types being less than or equal to a complexity threshold, identify (FIG. 2, 206) the entity as a spoofed entity associated with a spoofing attack. The processing system is further configured to perform (FIG. 2, 208) a security action (FIG. 3, 328) with regard to the entity based at least on the entity being identified as the spoofed entity associated with the spoofing attack.

(A2) In the example system of A1, wherein the processing system is further configured to: rank event types such that ranks of the event types correspond to likelihoods that events corresponding to the event types are detected; and select the specified event types from the event types based at least on the ranks of the specified event types being greater than or equal to a rank threshold.

(A3) In the example system of any of A1-A2, wherein the processing system is configured to: determine entropy of the distribution of the events among the specified event types based at least on the frequencies with which the events of the specified event types are initiated by the entity during the designated period of time.

(A4) In the example system of any of A1-A3, wherein the processing system is configured to: determine the complexity of the distribution of the events among the specified event types based at least on a number of the specified event types.

(A5) In the example system of any of A1-A4, wherein the processing system is configured to: determine the complexity of the distribution of the events among the specified event types based at least on a number of the frequencies with which the events of the specified event types are initiated by the entity during the designated period of time that are zero.

(A6) In the example system of any of A1-A5, wherein the processing system is configured to: determine the complexity of the distribution of the events among the specified event types based at least on a proportion of the frequencies with which the events of the specified event types are initiated by the entity during the designated period of time that are zero.

(A7) In the example system of any of A1-A6, wherein the processing system is configured to: determine the complexity of the distribution of the events among the specified event types based at least on a number of the frequencies with which the events of the specified event types are initiated by the entity during the designated period of time that are less than a positive frequency threshold.

(A8) In the example system of any of A1-A7, wherein the processing system is configured to: determine the complexity of the distribution of the events among the specified event types based at least on a proportion of the frequencies with which the events of the specified event types are initiated by the entity during the designated period of time that are less than a positive frequency threshold.

(A9) In the example system of any of A1-A8, wherein the processing system is configured to: determine the complexity of the distribution of the events among the specified event types based at least on a ratio of a first value to a second value, the first value being a number of the frequencies with which the events of the specified event types are initiated by the entity during the designated period of time that are greater than zero, the second value being a number of the frequencies with which the events of the specified event types are initiated by the entity during the designated period of time that are zero.

(A10) In the example system of any of A1-A9, wherein the processing system is configured to: determine the complexity of the distribution of the events among the specified event types based at least on a ratio of a first value to a second value, the first value being a Manhattan norm of the frequencies with which the events of the specified event types are initiated by the entity during the designated period of time, the second value being a Euclidian norm of the frequencies with which the events of the specified event types are initiated by the entity during the designated period of time.

(A11) In the example system of any of A1-A10, wherein the processing system is configured to: determine that a number of the events that are initiated by the entity during the designated period of time is greater than or equal to a threshold number; and determine the complexity of the distribution of the events among the specified event types in response to the number of the events that are initiated by the entity during the designated period of time being greater than or equal to the threshold number.

(A12) In the example system of any of A1-A11, wherein the processing system is configured to: compare the complexity of the distribution of the events among the specified event types to a reference complexity of a reference distribution of reference events among reference event types that are initiated by a reference entity that is different from the entity, which initiates the events during the designated period of time; and based at least on the complexity of the distribution of the events among the specified event types being less than the reference complexity of the reference distribution of the reference events among the reference event types by at least a threshold amount, identify the entity as the spoofed entity associated with the spoofing attack.

(A13) In the example system of any of A1-A12, wherein the processing system is configured to perform the security action by ignoring events that are received from the entity based at least on the entity being identified as the spoofed entity associated with the spoofing attack.

(A14) In the example system of any of A1-A13, wherein the processing system is configured to perform the security action by instructing other entities not to communicate with the entity based at least on the entity being identified as the spoofed entity associated with the spoofing attack.

(A15) In the example system of any of A1-A14, wherein the processing system is configured to perform the security action by initiating exclusion of a user of the entity from accessing a network based at least on the entity being identified as the spoofed entity associated with the spoofing attack.

(B1) An example method is implemented by a computing system (FIG. 1, 102A-102M, 106A-106N; FIG. 3, 300; FIG. 7, 700). The method comprises determining (FIG. 2, 202) frequencies with which events (FIG. 3, 320) of specified event types are initiated by an entity during a designated period of time. The method further comprises determining (FIG. 2, 204) complexity of a distribution of the events among the specified event types based at least on the frequencies with which the events of the specified event types are initiated by the entity during the designated period of time. The method further comprises, based at least on the complexity of the distribution of the events among the specified event types being less than or equal to a complexity threshold, identifying (FIG. 2, 206) the entity as a spoofed entity associated with a spoofing attack. The method further comprises performing (FIG. 2, 208) a security action (FIG. 3, 328) with regard to the entity based at least on the entity being identified as the spoofed entity associated with the spoofing attack.

(B2) In the method of B1, further comprising: ranking event types such that ranks of the event types correspond to likelihoods that events corresponding to the event types are detected; and selecting the specified event types from the event types based at least on the ranks of the specified event types being greater than or equal to a rank threshold.

(B3) In the method of any of B1-B2, wherein determining the complexity of the distribution comprises: determining entropy of the distribution of the events among the specified event types based at least on the frequencies with which the events of the specified event types are initiated by the entity during the designated period of time.

(B4) In the method of any of B1-B3, wherein determining the complexity of the distribution comprises: determining the complexity of the distribution of the events among the specified event types based at least on a number of the specified event types.

(B5) In the method of any of B1-B4, wherein determining the complexity of the distribution comprises: determining the complexity of the distribution of the events among the specified event types based at least on a number of the frequencies with which the events of the specified event types are initiated by the entity during the designated period of time that are zero.

(B6) In the method of any of B1-B5, wherein determining the complexity of the distribution comprises: determining the complexity of the distribution of the events among the specified event types based at least on a proportion of the frequencies with which the events of the specified event types are initiated by the entity during the designated period of time that are zero.

(B7) In the method of any of B1-B6, wherein determining the complexity of the distribution comprises: determining the complexity of the distribution of the events among the specified event types based at least on a number of the frequencies with which the events of the specified event types are initiated by the entity during the designated period of time that are less than a positive frequency threshold.

(B8) In the method of any of B1-B7, wherein determining the complexity of the distribution comprises: determining the complexity of the distribution of the events among the specified event types based at least on a proportion of the frequencies with which the events of the specified event types are initiated by the entity during the designated period of time that are less than a positive frequency threshold.

(B9) In the method of any of B1-B8, wherein determining the complexity of the distribution comprises: determining the complexity of the distribution of the events among the specified event types based at least on a ratio of a first value to a second value, the first value being a number of the frequencies with which the events of the specified event types are initiated by the entity during the designated period of time that are greater than zero, the second value being a number of the frequencies with which the events of the specified event types are initiated by the entity during the designated period of time that are zero.

(B10) In the method of any of B1-B9, wherein determining the complexity of the distribution comprises: determining the complexity of the distribution of the events among the specified event types based at least on a ratio of a first value to a second value, the first value being a Manhattan norm of the frequencies with which the events of the specified event types are initiated by the entity during the designated period of time, the second value being a Euclidian norm of the frequencies with which the events of the specified event types are initiated by the entity during the designated period of time.

(B11) In the method of any of B1-B10, further comprising: determining that a number of the events that are initiated by the entity during the designated period of time is greater than or equal to a threshold number; wherein determining the complexity of the distribution of the events among the specified event types comprises: determining the complexity of the distribution of the events among the specified event types in response to the number of the events that are initiated by the entity during the designated period of time being greater than or equal to the threshold number.

(B12) In the method of any of B1-B11, wherein identifying the entity as the spoofed entity associated with the spoofing attack comprises: comparing the complexity of the distribution of the events among the specified event types to a reference complexity of a reference distribution of reference events among reference event types that are initiated by a reference entity that is different from the entity, which initiates the events during the designated period of time; and based at least on the complexity of the distribution of the events among the specified event types being less than the reference complexity of the reference distribution of the reference events among the reference event types by at least a threshold amount, identifying the entity as the spoofed entity associated with the spoofing attack.

(B13) In the method of any of B1-B12, wherein performing the security action comprises: ignoring events that are received from the entity based at least on the entity being identified as the spoofed entity associated with the spoofing attack.

(B14) In the method of any of B1-B13, wherein performing the security action comprises: instructing other entities not to communicate with the entity based at least on the entity being identified as the spoofed entity associated with the spoofing attack.

(B15) In the method of any of B1-B14, wherein performing the security action comprises: initiating exclusion of a user of the entity from accessing a network based at least on the entity being identified as the spoofed entity associated with the spoofing attack.

(C1) An example computer program product (FIG. 7, 718, 722) comprising a computer-readable storage medium having instructions recorded thereon for enabling a processor-based system (FIG. 1, 102A-102M, 106A-106N; FIG. 3, 300; FIG. 7, 700) to perform operations. The operations comprise determining (FIG. 2, 202) frequencies with which events (FIG. 3, 320) of specified event types are initiated by an entity during a designated period of time. The operations further comprise determining (FIG. 2, 204) complexity of a distribution of the events among the specified event types based at least on the frequencies with which the events of the specified event types are initiated by the entity during the designated period of time. The operations further comprise, based at least on the complexity of the distribution of the events among the specified event types being less than or equal to a complexity threshold, identifying (FIG. 2, 206) the entity as a spoofed entity associated with a spoofing attack. The operations further comprise performing (FIG. 2, 208) a security action (FIG. 3, 328) with regard to the entity based at least on the entity being identified as the spoofed entity associated with the spoofing attack.

III. Example Computer System

FIG. 7 depicts an example computer 700 in which embodiments may be implemented. Any one or more of the user devices 102A-102M and/or any one or more of the servers 106A-106N shown in FIG. 1 and/or the computing system 300 shown in FIG. 3 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the event-based spoof detection logic 108, the event-based spoof detection logic 308, the frequency determination logic 312, the complexity determination logic 314, the spoof identification logic 316, the security action logic 318, the ranking logic 330, the selection logic 332, and/or flowchart 200 (including any step of flowchart 200), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   a processing system coupled to the memory, the processing system configured to:
   determine frequencies with which events of specified event types are initiated by an entity during a designated period of time;
   determine complexity of a distribution of the events among the specified event types based at least on one or more of the following:
   a number of the frequencies that are equal to zero, or
   a proportion of the frequencies that are equal to zero;
   based at least on the complexity of the distribution of the events among the specified event types being less than or equal to a complexity threshold, identify the entity as a spoofed entity associated with a spoofing attack; and
   perform a security action with regard to the entity based at least on the entity being identified as the spoofed entity associated with the spoofing attack.

2. The system of claim 1, wherein the processing system is further configured to:
   rank event types such that ranks of the event types correspond to likelihoods that events corresponding to the event types are detected; and
   select the specified event types from the event types based at least on the ranks of the specified event types being greater than or equal to a rank threshold.

3. The system of claim 1, wherein the processing system is configured to:
   determine entropy of the distribution of the events among the specified event types based at least on the frequencies with which the events of the specified event types are initiated by the entity during the designated period of time.

4. The system of claim 1, wherein the processing system is configured to:
   determine the complexity of the distribution of the events among the specified event types further based at least on a number of the specified event types.

5. The system of claim 1, wherein the processing system is configured to:
   determine the complexity of the distribution of the events among the specified event types based at least on the number of the frequencies that are equal to zero.

6. The system of claim 1, wherein the processing system is configured to:
   determine the complexity of the distribution of the events among the specified event types further based at least on a number of the frequencies that are less than a positive frequency threshold.

7. The system of claim 1, wherein the processing system is configured to:
   determine the complexity of the distribution of the events among the specified event types based at least on a ratio of a first value to a second value, the first value being a number of the frequencies that are greater than zero, the second value being the number of the frequencies that are equal to zero.

8. The system of claim 1, wherein the processing system is configured to:
   determine the complexity of the distribution of the events among the specified event types further based at least on a ratio of a first value to a second value, the first value being a Manhattan norm of the frequencies, the second value being a Euclidian norm of the frequencies.

9. The system of claim 1, wherein the processing system is configured to:
- determine that a number of the events that are initiated by the entity during the designated period of time is greater than or equal to a threshold number; and
- determine the complexity of the distribution of the events among the specified event types in response to the number of the events that are initiated by the entity during the designated period of time being greater than or equal to the threshold number.

10. The system of claim 1, wherein the processing system is configured to:
- compare the complexity of the distribution of the events among the specified event types to a reference complexity of a reference distribution of reference events among reference event types that are initiated by a reference entity that is different from the entity, which initiates the events during the designated period of time; and
- based at least on the complexity of the distribution of the events among the specified event types being less than the reference complexity of the reference distribution of the reference events among the reference event types by at least a threshold amount, identify the entity as the spoofed entity associated with the spoofing attack.

11. The system of claim 1, wherein the processing system is configured to perform the security action by ignoring events that are received from the entity based at least on the entity being identified as the spoofed entity associated with the spoofing attack.

12. The system of claim 1, wherein the processing system is configured to perform the security action by instructing other entities not to communicate with the entity based at least on the entity being identified as the spoofed entity associated with the spoofing attack.

13. The system of claim 1, wherein the processing system is configured to perform the security action by initiating exclusion of a user of the entity from accessing a network based at least on the entity being identified as the spoofed entity associated with the spoofing attack.

14. A method implemented by a computing system, the method comprising:
- determining frequencies with which events of specified event types are initiated by an entity during a designated period of time;
- determining complexity of a distribution of the events among the specified event types based at least on one or more of the following:
  - a number of the frequencies that are equal to zero, or
  - a proportion of the frequencies that are equal to zero;
- based at least on the complexity of the distribution of the events among the specified event types being less than or equal to a complexity threshold, identifying the entity as a spoofed entity associated with a spoofing attack; and
- performing a security action with regard to the entity based at least on the entity being identified as the spoofed entity associated with the spoofing attack.

15. The method of claim 14, wherein determining the complexity of the distribution comprises:
- determining entropy of the distribution of the events among the specified event types based at least on the frequencies with which the events of the specified event types are initiated by the entity during the designated period of time.

16. The method of claim 14, wherein determining the complexity of the distribution comprises:
- determining the complexity of the distribution of the events among the specified event types based at least on the proportion of the frequencies that are equal to zero.

17. The method of claim 14, wherein determining the complexity of the distribution comprises:
- determining the complexity of the distribution of the events among the specified event types further based at least on a proportion of the frequencies that are less than a positive frequency threshold.

18. The method of claim 14, wherein determining the complexity of the distribution comprises:
- determining the complexity of the distribution of the events among the specified event types based at least on a ratio of a first value to a second value, the first value being a number of the frequencies that are greater than zero, the second value being the number of the frequencies that are equal to zero.

19. The method of claim 14, wherein determining the complexity of the distribution comprises:
- determining the complexity of the distribution of the events among the specified event types further based at least on a ratio of a first value to a second value, the first value being a Manhattan norm of the frequencies, the second value being a Euclidian norm of the frequencies.

20. A computer program product comprising a computer-readable storage medium having instructions recorded thereon for enabling a processor-based system to perform operations, the operations comprising:
- determining frequencies with which events of specified event types are initiated by an entity during a designated period of time;
- determining complexity of a distribution of the events among the specified event types based at least on one or more of the following:
  - a number of the frequencies that are equal to zero, or
  - a proportion of the frequencies that are equal to zero;
- based at least on the complexity of the distribution of the events among the specified event types being less than or equal to a complexity threshold, identifying the entity as a spoofed entity associated with a spoofing attack; and
- performing a security action with regard to the entity based at least on the entity being identified as the spoofed entity associated with the spoofing attack.

* * * * *